Figure 1A:
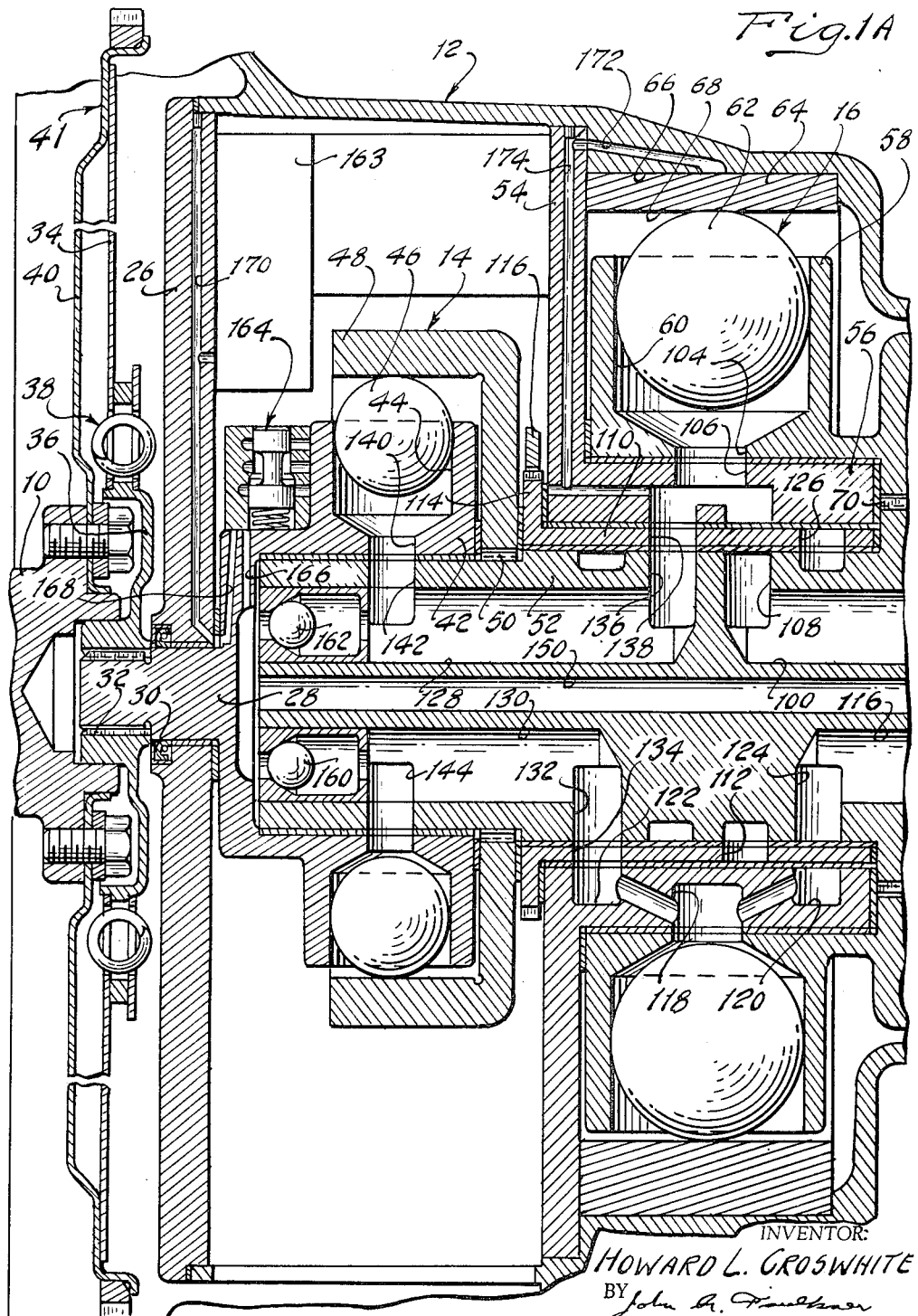

Sept. 14, 1965

H. L. CROSWHITE 3,205,660

HYDROSTATIC POWER TRANSMISSION MECHANISM
WITH TWO PERFORMANCE ZONES

Filed June 1, 1964

2 Sheets-Sheet 1

INVENTOR:
HOWARD L. CROSWHITE
BY John A. Faulkner
and Donald J. Harrington
ATTORNEYS.

United States Patent Office 3,205,660
Patented Sept. 14, 1965

3,205,660
HYDROSTATIC POWER TRANSMISSION MECHANISM WITH TWO PERFORMANCE ZONES
Howard L. Croswhite, Livonia, Mich., assignor to Ford Motor Company, Dearborn, Mich., a corporation of Delaware
Filed June 1, 1964, Ser. No. 371,576
3 Claims. (Cl. 60—53)

My invention relates generally to hydrostatic torque delivery systems, and more particularly to a hydrostatic power transmission mechanism having positive displacement pump and motor units situated in a closed hydrostatic circuit wherein provision is made for obtaining an infinite variation in torque ratio. Power is delivered through the units from a driving member to a driven member.

A preferred embodiment of my invention includes three hydrostatic fluid displacement units that are connected together differentially to define a power flow path from a driving member to a driven member that is partly hydrostatic and partly mechanical, the hydrostatic portion of the power flow path including two semi-isolated circuits. One circuit provides a hydraulic connection between a first hydrostatic unit and a second hydrostatic unit during operation of the mechanism in a first performance zone. During operation in a second performance zone the other circuit of the hydrostatic fluid flow path interconnects the second hydrostatic unit with the third hydrostatic unit. The second hydrostatic unit, which is common to both circuits, includes a means for varying its fluid displacement with respect to each of the other two hydrostatic units, the displacements of which are constant.

The flow of hydrostatic fluid through each of the hydrostatic circuits is controlled by a personally operable valve assembly. In this fashion either the first unit or the second unit can be rendered inactive as the mechanism is conditioned for torque delivery.

The torque ratio that is achieved when the second and third units are functioning is related to the relative displacements of these units with a hyperbolic function. In contrast, during operation in a zone in which the first hydrostatic unit and the second hydrostatic unit are operative, the torque ratio that is achieved is related to the relative displacements of the units with a linear function.

I am aware of hydrostatic power transmission systems in which the displacement characteristics are solely of the linear type and I am aware also of other power transmission systems in which the displacement characteristics are solely hyperbolic. Each system has its advantages and disadvantages. For example, in a linear system the power flow path is regenerative when the over-all torque ratio is less than unity and thus the efficiency is often less than that which would be desired. A high efficiency unit would be required during underdrive, for example, in an automotive vehicle driveline, but the high efficiency must be achieved without an accompanying sacrifice in performance. In a linear system the efficiency is improved substantially when the over-all torque ratio is greater than unity since under these conditions the power flow path between the driving and driven members is split with a portion of the power being distributed hydrostatically while the balance of the power is distributed mechanically.

The so-called hyperbolic systems, on the other hand, are known to be efficient when the transmission mechanism assumes an over-all torque ratio less than unity. On the other hand, when a hyperbolic system is operating in a range that requires a torque ratio greater than unity, the power flow path is regenerative and the efficiency is reduced.

It is an object of my invention to provide a transmission system that is capable of taking advantage of the desirable features of both the linear system and the hyperbolic system to provide high efficiency operation in both underdrive and overdrive.

It is another object of my invention to provide an improved hydrostatic power transmission mechanism of the type set forth in the foregoing object and which includes a personally operable valve arrangement for establishing selectively a hyperbolic performance relationship between one pair of hydrostatic units and a linear performance relationship between another pair of hydrostatic units.

Figure 1B:
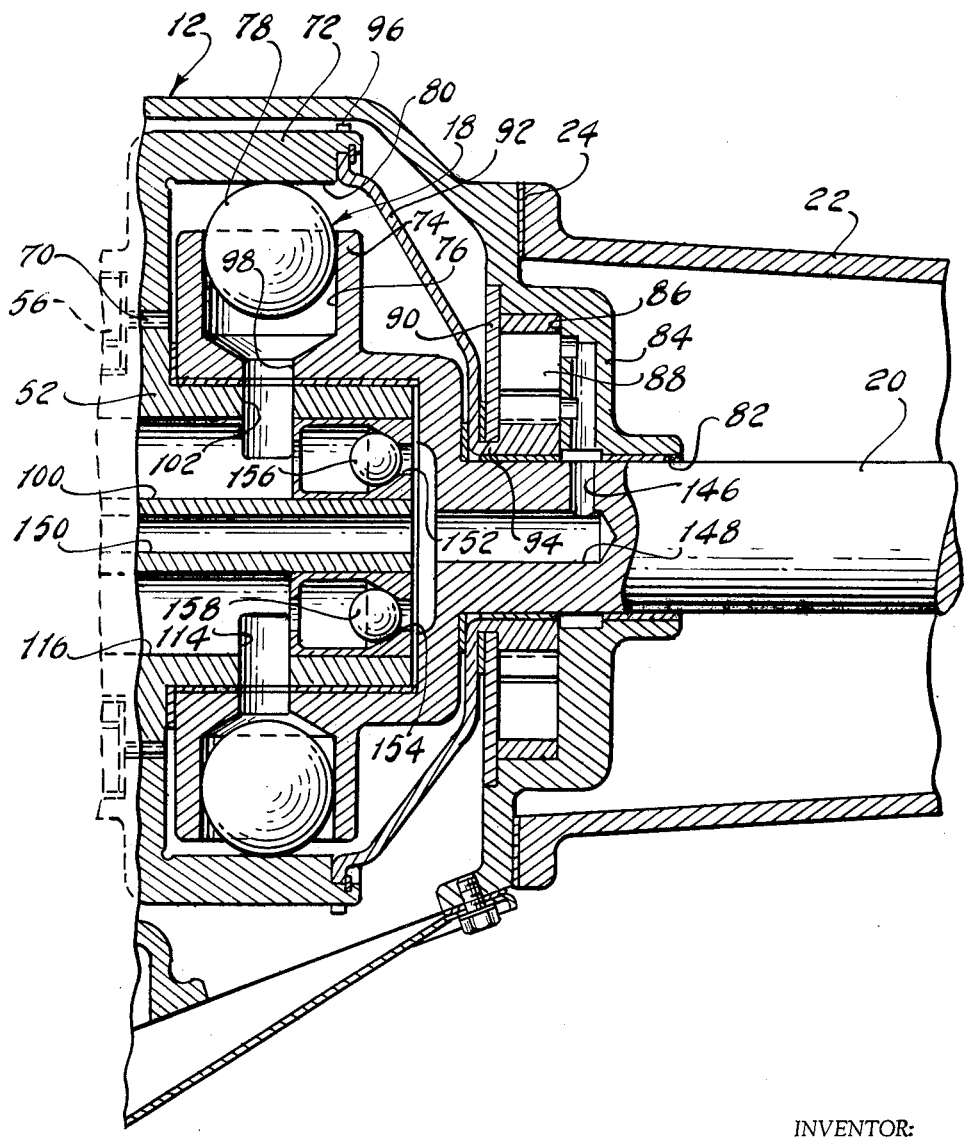

For the purpose of describing my invention more particularly, reference will be made to the accompanying drawing which shows in longitudinal cross sectional form in FIGS. 1A and 1B a hydrostatic power transmission system embodying the features of my invention.

In the drawing numeral 10 designates a portion of a crankshaft for an internal combustion engine in an automotive vehicle driveline. Numeral 12 designates generally a housing that encloses three positive displacement hydrostatic units identified respectively by reference characters 14, 16 and 18. A driven shaft 20 may be connected drivably to the vehicle traction wheels through a suitable driveline and differential and axle assembly. It is surrounded by a tailshaft housing 22 which is bolted to an end wall 24 of the housing 12. The housing 12 includes also a forward wall 26.

A power input shaft 28 is journaled within a central opening 30 formed in the forward wall 26, a suitable bushing being provided for this purpose. Shaft 28 is splined at 32 to a drive plate 34 which includes a hub 36 and a torsional damper spring assembly 38, the latter connecting the hub 36 with the radially outward disc portion of plate 34.

Crankshaft 10 is connected drivably to the hub of a drive plate 40, the outer periphery of which is secured at 41 to the plate 34.

The hydrostatic unit 14 includes a cage or cylinder body 42 which is connected integrally to shaft 28. Cylinder body 42 is formed with a plurality of radially disposed cylinders 44 within which are received ball piston elements 46. Surrounding the balls 46 is a cammed ring 48. By preference the inner surface of the ring 48 that contacts the balls 46 is prolate in form. Thus, as the cylinder body 42 makes a 360° revolution with respect to the ring 48 the balls 46 reciprocate in two separate cycles.

The cam ring 48 is splined at 50 to a central torque delivery shaft 52. The cylinder body 42 is journaled by means of bushings for rotation upon shaft 52.

The housing 12 is formed with a center support wall 54 which has secured thereto at a radially inward region a stationary sleeve pintle shaft 56. Rotatably journaled upon shaft 56 is a cylinder body or cage 58 for the hydrostatic unit 16. Cylinder body 58 includes a plurality of radially disposed cylinders 60. A ball piston element 62 is situated within each cylinder 60. Balls 62 are adapted to engage a rotary cam ring 64 that is supported by the housing 12 within a cooperating circular bearing surface 66. Ring 64 is adapted to rotate relative to the housing 12.

The inner bearing surface 68 for the ring 64 is eccentrically positioned with respect to the axis of the hydrostatic units. This eccentricity can be changed, however, as the ring 64 is rotated with respect to the cylindrical surface 66. Suitable fluid pressure operated servos can be provided for adjusting the ring 64 in either angular direction. This allows the displacement of the unit 16 to be varied.

Body 58 is splined at 70 to the central torque delivery shaft 52 and thus is connected directly to a cam ring 72 for the hydrostatic unit 18.

The unit 18 includes a cylinder body or cage 74 having formed therein a plurality of radially disposed cylindrical openings 76. A ball piston element 78 is received within each cylindrical opening. The balls 78 engage the inner surface 80 of the cam ring 72. Like the ring 48, the ring 72 may be formed with a prolate shape so that the balls 58 will reciprocate through two complete cycles for each revolution of the cylinder body 74 with respect to the ring 72.

The cylinder body 74 is journaled for rotation upon the central torque delivery shaft 52.

Power output shaft 20 is connected directly to cylinder body 74. It is journaled within an opening 82 formed in a transmission end wall 84. This wall forms a part of the housing 12. Wall 84 defines a positive displacement pump cavity 86 that receives pumping elements 88. The chamber 86 within which the elements 88 are received is closed by a pump closure plate 90 secured to wall 84.

One of the elements 88 is drivably connected to the hub of a pump drive plate 92, a suitable key connection 94 being provided for this purpose. The outer periphery of the drive plate 92 is splined or keyed as shown at 96 to the cam ring 72.

The pump structure of which elements 88 form a part acts as a supercharge pump for the hydrostatic system.

The ball piston elements for each of the hydrostatic units are adapted to roll upon their respective cam races. This causes them to spin about a spin axis that is parallel to the axis of their respective cylinder bodies.

Internal passage structure defined by the torque delivery shaft 52 provides cross flow paths between the hydrostatic units. Each hydrostatic unit is formed with a radial port that communicates with separate portions of the flow paths.

The cylinder body 74 for the hydrostatic unit 18 includes a radial port 98 that is in fluid communication with an axial passage 100 formed in shaft 52. This communication is established by a radial port 102 formed in the shaft 52.

The cylinder body 58 for the hydrostatic unit 16 includes a port 104 that is in fluid communication with a bipartite port 106 formed in the stationary shaft 56. One part of port 106 is in fluid communication with passage 100 through a port 108 formed in shaft 52. Situated between shaft 56 and the shaft 52 is a sleeve valve 110 which has formed therein a valve port 112. Sleeve valve 110 is separated from shaft 52 and the inner surface of the shaft 56 by bushings as indicated. It may be rotated about its axis by means of a gear element 114 formed at one end thereof. This gear element is adapted to mesh with a manually controlled pinion shown in part at 116.

When the sleeve valve 110 assumes the position shown in the drawings, it interrupts communication between port 106 and port 108. If it is rotated a sufficient amount, however, port 112 is brought into registry with port 108 so that communication is established between port 106 and the passage 100.

The port 102 communicates with a plurality of ports 98 for the respective cylinders 96 at any given instant. Other ports 98 communicate with another port 114 formed in the shaft 52. This port 114 communicates with another fluid pressure passage 116 formed in the shaft 52.

The shaft 56 is formed also with a port 118 that includes two branch portions 120 and 122. The portion 120 is adapted to communicate with a port 124 formed in shaft 52. The circular valve sleeve 110, however, interrupts communication between ports 120 and 124 when it assumes the position shown. If the valve sleeve 110 is rotated, however, port 126 formed in the valve sleeve is brought into registry with port 124 thereby establishing communication between port 118 and passage 116. When this occurs passage 100 also is in communication with port 106.

Shaft 52 is formed also with another pair of internal axially extending passages 128 and 130. Passage 130 communicates with the portion 122 of the port 118 through a port 132 in the shaft 52 and a port 134 in the valve sleeve 110. In a similar fashion passage 128 communicates with port 104 through a port 136 in the shaft 52 and a port 138 in the valve sleeve 110. When the valve sleeve 110 is positioned as shown, ports 134 and 138 are aligned with the respective ports of the shaft 52 thereby establishing free flow through the valve.

Passage 128 communicates with the valve ports 140 in the cylinder body 42 through a port 142 formed in the shaft 52. In a similar fashion, passage 130 communicates with the ports 140 through a port 144 formed in the shaft 52.

When the valve sleeve 110 is positioned as shown, the hydrostatic unit 18 becomes hydraulically locked and therefore is capable of functioning as a hydraulic clutch between shaft 52 and power output shaft 20. The hydrostatic units 14 and 16, however, are in fluid communication with each other and are capable of establishing a hydrostatic torque delivery path as torque is delivered to the cylinder body 42 from the engine crankshaft 10. Under these conditions passage 128 becomes a high pressure passage and passage 130 becomes a low pressure passage. If the displacement of hydrostatic unit 16 is of such a value that it acts as a motor and the hydrostatic unit 14 acts as a pump, the system is capable of multiplying torque. High pressure fluid created by the pumping action of the ball piston elements 46 will drive the cylinder body 58 and the race 64 will act as a reaction point. The motion of the cylinder body 58 is transferred directly through the hydrostatic unit 18 to the power output shaft 20. The fluid that is returned from the hydrostatic unit 16 under low pressure is distributed back to inlet port 144 to low pressure passage 130.

On the other hand, if the displacement of the hydrostatic unit 16 is varied until it is capable of acting as a pump with the hydrostatic unit 14 acting as a motor, a regenerative torque delivery path is established. The cylinder body 42 then is driven hydrostatically by the hydrostatic unit 16. This occurs when the cylinder body 58 is driven at a speed greater than the speed of rotation of cylinder body 42.

If the valve sleeve 110 is rotated until port 136 and port 132 become blocked, the ports 108 and 124 will become opened. Under these conditions the hydrostatic unit 14 acts as a hydraulic clutch for delivering torque directly from crankshaft 10 to the shaft 52. The cylinder body 58 for the hydrostatic unit 16 thus is driven at engine speed. When the mechanism is operating in this fashion it is capable of multiplying torque whenever the displacement of the hydrostatic unit 16 is such that it will act as a motor while the hydrostatic unit 18 acts as a pump. Thus, the torque delivery path is regenerative.

If the displacement of the hydrostatic unit 16 is such that it acts as a pump while the hydrostatic unit 18 acts as a motor, an overdrive condition exists with a portion of the torque being distributed hydraulically while the balance is distributed mechanically.

While the units 16 and 18 are functioning, passage 100 acts as a high pressure delivery passage while the passage 116 acts as a lower pressure return passage from the pump to the motor.

To avoid cavitation and to replace hydrostatic fluid that is lost through leakage, the supercharge pump shown in part at 88 communicates through a radial port 46 and an axial passage 148 in the shaft 20 with a central supercharge pressure passage 150 formed in the shaft 52. It communicates also with valve ports 152 and 154 which respectively communicate with passages 100 and 116. Check valves 156 and 158 provide one-way fluid flow between the passage 148 and each of the passages 100 and 116. If passage 100 is a high pressure passage, valve 156 will be closed and valve 158 will be opened. Thus, the supercharge pressure passage always communicates with the low pressure side of the hydrostatic system.

If the hydrostatic unit 18 is locked-up and the hydrostatic unit 14 is operative, supercharge pressure is distributed to the low pressure side of that hydrostatic circuit through one or the other of the check valves 160 and 162 which respectively communicate with passages 130 and 128. If passage 128 is the high pressure passage during normal forward driving operation under torque, valve 162 will be closed and valve 160 will be opened.

If the direction of torque delivery is reversed for some reason, passages 100 and 128 will function as a low pressure flow return passage while the passage 130 and 116 will function as high pressure delivery passages.

A valve body is shown at 163. It is secured to the interior of the housing 12. It may include automatic control valves for controlling the displacement of the hydrostatic unit 16 to meet varying road load requirements. It receives a speed signal from a centrifugally operated fluid pressure governor valve assembly 164 that is in fluid communication with the supercharge pressure circuit through a governor feed passage 166. The output signal of the valve assembly 164 is distributed to the valve body 163 through a governor pressure delivery passage 168 formed in the cylinder body 42 and a passage 170 formed in the wall 26. Low pressure can be distributed to the valve body 163 through internal passage structure that communicates with the high pressure side of the circuit.

Lubricating pressure can be distributed to the bearing surface 66 for cam ring 64 through a passage 172 and a passage 174 formed respectively in the housing 12 and in the center support wall 54. Passage 174 communicates with port 106 as indicated.

It is possible to select those pairs of hydrostatic units that will produce the most efficient mode of operation for any given driving condition. For example, when it is desired to condition the mechanism for torque multiplication the valve sleeve 110 is positioned as shown. This provides a split torque delivery path as described previously. The over-all torque ratio then can be varied by appropriately positioning the cam ring 64 to vary the displacement of the hydrostatic unit 16. When the displacement reaches that value at which the hydrostatic unit 14 would act as a motor, the valve sleeve 110 is rotated to block ports 136 and 132 and to open simultaneously ports 108 and 124. This renders the hydrostatic unit 14 inoperable although it is capable of acting as a direct drive clutch between crankshaft 10 and the shaft 52. The hydrostatic unit 18 now becomes a part of the torque delivery system. It acts, however, as a motor rather than as a pump since the displacement of the hydrostatic unit 16 is such that it will deliver high pressure fluid to the cylinder body 74 thereby driving it at a faster speed than the speed of rotation of the race 72. This establishes an overdrive condition.

Upon further adjustment of the displacement of the hydrostatic unit 16, the speed of shaft 20 relative to the crankshaft speed can be increased still further.

To obtain reverse drive while the hydrostatic units 16 and 18 are operative, it merely is necessary to reverse the direction of the displacement of the hydrostatic unit 16 without altering the position of the valve sleeve 110 until the position of the cam ring 64 passes beyond the position at which the displacements of the hydrostatic units 16 and 18 are equal. It is possible, of course, to obtain reverse drive while the hydrostatic units 14 and 16 are operative by using this same procedure. Thus, the valve 110 can be maintained in the position shown as the displacement of the hydrostatic unit 16 is decreased to a value such that it will equal the displacement of the hydrostatic unit 14. As the ring is adjusted still further in that direction, the cylinder body 58 will begin to rotate in a reverse direction that is opposite to the direction of rotation of shaft 10.

It thus is possible to operate the mechanism throughout a wide range of forward driving speed ratios with the engine driven hydrostatic unit always acting as a pump. This is made possible by reason of the dual range driving characteristic that is controlled by the sleeve valve 110. During initial acceleration the units 14 and 16 are operative while the unit 18 acts as a clutch. After a 1:1 drive ratio is achieved the valve 110 is rotated so that the hydrostatic unit 14 becomes locked up and the unit 16 begins to function as a pump rather than as a motor while the unit 18 begins to operate as a motor. Thereafter an overdrive condition is assumed. An infinite variation of the over-all ratio is achieved from a high underdrive ratio to a low overdrive ratio while the units are caused to operate in their most efficient fashion. To effect a smooth transition from one operating range to the other it is necessary that the displacement units 14 and 18 be equal. This requirement has incidental design advantages since it is possible then to use several parts of the units interchangeably.

Having thus described a preferred form of my invention, what I claim and desire to secure by United States Letters Patent is:

1. A hydrostatic power transmission system comprising three hydrostatic pumping units, means for varying the displacement of one of said units, the displacements of the other units being constant and of equal value, separate hydrostatic fluid flow circuits interconnecting each constant displacement unit with said variable displacement unit, one portion of one of said constant displacement units being connected to a driven member, one portion of the other constant displacement unit being connected to a driving member, another portion of each constant displacement unit being connected to a common portion of said variable displacement unit, and valve means for selectively interrupting the fluid flow circuit for one constant displacement unit while completing the fluid flow circuit for the other constant displacement unit.

2. A hydrostatic power transmission mechanism comprising a variable displacement hydrostatic pumping unit and two constant displacement hydrostatic units, a driving member, a driven member, said driving member being connected to a driving portion of one constant displacement unit, a driven portion of the other constant displacement unit being connected to said driven member, a driven portion of said first constant displacement unit being connected to a rotary portion of said variable displacement unit and to a driving portion of said other constant displacement unit, a first closed hydrostatic fluid flow circuit interconnecting said variable displacement unit and said one constant displacement unit, a second closed hydrostatic fluid flow circuit interconnecting said variable displacement unit and the other constant displacement unit, and valve means for selectively interrupting one of said fluid flow circuits while completing the other.

3. A power transmission system for delivering torque from a driving member to a driven member, a stationary housing, three hydrostatic pumping units, each pumping unit comprising a rotary cylinder housing having a plurality of cylinders formed therein, a piston element mounted in each cylinder, a reaction member surrounding the piston elements for each hydrostatic unit, means for varying the displacement of one of said hydrostatic units, the reaction member for said variable displacethe other hydrostatic units being of constant displacement, the cylinder body for a first of said constant displacement units being connected to said driving member, the cylinder body for the other of said constant displacement unit being connected to said driven member, the reaction members for each constant displacement unit being connected to each other and to the cylinder body for said variable displacement unit, a separate fluid flow path interconnecting said variable displacement hydrostatic unit with each constant displacement hydrostatic unit, and valve means for selectively blocking and completing each fluid flow path.

No references cited.

JULIUS E. WEST, *Primary Examiner.*